July 28, 1925.
C. H. BIBB
1,547,725
PRODUCTION OF PHENOL
Filed June 18, 1923
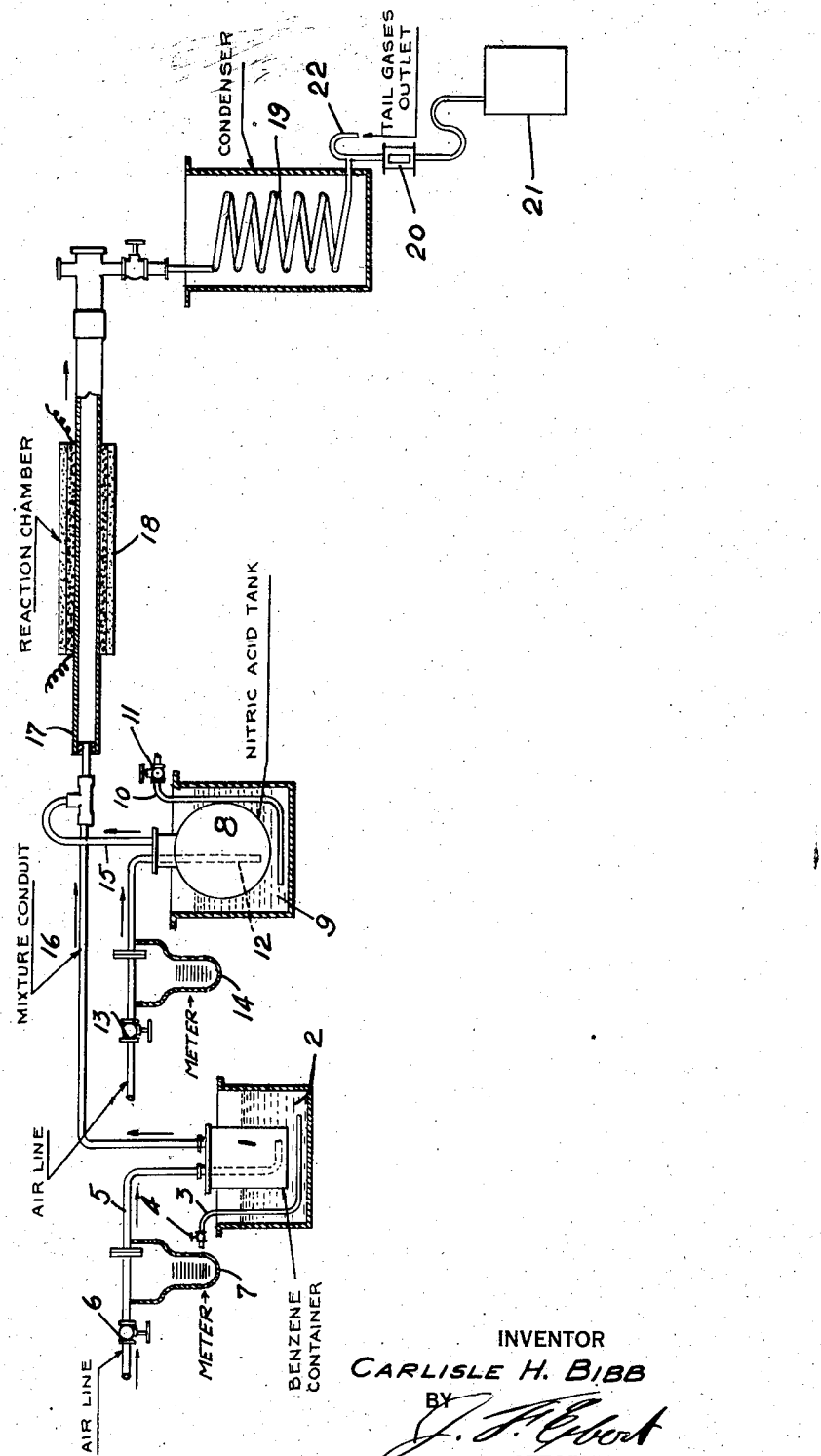
INVENTOR
CARLISLE H. BIBB
BY
ATTORNEY Patented July 28, 1925.

1,547,725

UNITED STATES PATENT OFFICE.

CARLISLE H. BIBB, OF NEW BRUNSWICK, NEW JERSEY.

PRODUCTION OF PHENOL.

Application filed June 18, 1923. Serial No. 645,966.

*To all whom it may concern:*

Be it known that I, CARLISLE H. BIBB, a citizen of the United States, residing in New Brunswick, in the county of Middlesex and State of New Jersey, have invented certain new and useful Improvements in the Production of Phenol, of which the following is a full, clear, concise, and exact description.
In my Reissue Patent No. 15,789 issued March 11, 1924, covering a process of making aldehydes and other oxidation products, there is disclosed a process for producing alcohols, aldehydes and other oxidation products from hydrocarbons, and a specific example is given of converting methane into formaldehyde. The present invention is related to the general subject matter of my above mentioned patent in that it contemplates the production of phenol from benzene.

Although the said patent relates generally to the production of aldehydes and other oxidation products from hydrocarbons, it is not at all possible to predict therefrom that if a certain reaction takes place between a given compound and an aliphatic compound that a similar reaction will take place between the given compound and an aromatic compound under similar conditions. It was the realization of this discovery which resulted in the present invention, i. e. by using benzene instead of methane in the process set forth in the above mentioned patent, under proper conditions, it is possible to produce phenol in the place of formaldehyde.

An object of the invention is the provision of a process whereby phenol may be made simply and cheaply.
Another object of the invention is the provision of a process for producing phenol which employs largely constituents which are available in great quantities and of such a character that the process can be readily practiced.

Another object of the invention is the modification or simplification of the process described in my aforesaid patent so as to make the general principles or steps thereof applicable to the production of phenol.

Other objects and advantages will be apparent from a reading of the following description.

In accordance with the invention, phenol is produced from benzene by mixing the same with oxides of nitrogen, either alone or with air or oxygen; any substance that will liberate oxides of nitrogen under the conditions of the process hereinafter more fully described may be used in the place of free oxides of nitrogen. The reactions between the mixture thus formed are effected by passing the same through a heated chamber.

In carrying out the process air may be mixed with benzene vapor in a suitable manner, such as causing the air to pass through liquid benzene thus permitting the air to become charged with the vapor of benzene, or the liquid benzene may be distilled or sprayed into the air stream. The resulting mixture, or the air before coming in contact with the benzene or the benzene vapor alone, is also mixed with a nitrogen oxide, or a mixture of nitrogen oxides, in any suitable manner such as passing the air through a solution of nitric acid or by distilling the nitric acid into the air stream or by spraying it into the gaseous mixture. Oxides of nitrogen may also be produced in the air stream by electrical discharge or by decomposition of such compounds that yield nitrous oxides. Water may be added if desired.

The resulting mixture of air, benzene and diluted or concentrated nitric acid or the oxides of nitrogen is then led through a heated reaction chamber which preferably consists of a tube of silica, porcelain or fireclay. It may or may not be filled with such materials as would facilitate the contact of the gases without taking part in the reaction, for example, aluminum oxide, zirconium oxide, etc. The tube is preferably heated to a dull red heat. The benzene in passing through the reaction chamber in the presence of the air and nitrogen oxides is partly oxidized to phenol, which is carried out of the reaction chamber by the gases and condensed and separated from the air, unattacked benzene and by-products in a suitable manner.

The invention will be best understood by giving a specific example, which comes within the variations just described and defined by the appended claims.

In the accompanying drawing there is illustrated diagrammatically an apparatus suitable for practicing the invention.

Referring to the drawing, benzene is placed in a closed container 1 suspended in a water bath 2 adapted to be heated in any suitable manner as by a steam line 3 having inserted therein a valve 4 for controlling the supply of steam. The benzene is maintained at a temperature of about 60° C. and an air current is passed therethrough by means of an air line provided with a control valve 6 and meter 7. The air is admitted near the bottom of the container 1 and in such a quantity that the gaseous mixture which leaves the same consists of three parts by volume of air and one part of benzene vapor.

Nitric acid is placed within a tank 8 which is also suspended in a hot water bath 9 adapted to be heated from steam line 10 controlled by a valve 11. Air is admitted into the tank 8 near the bottom thereof by means of a pipe 12 from a system including a control valve 13 and meter 14. The air charged with nitric acid fumes passes from tank 8 through a pipe 15 to a mixture conduit 16 connected with the container 1. The flow of the nitric acid fumes is so regulated that they constitute about 1% of the mixture in the conduit 16. The mixture of air, benzene vapor and nitric acid fumes is then passed through one or more silica tubes 17 which are preferably heated to about 700° C. in an electric furnace 18. The speed of the bases through the tube or reaction chamber 17 is so regulated that they remain therein approximately three seconds.

After passing through the furnace 18 the hot gases are cooled to about 85° C. by circulating the same through a condenser 19. At this stage in the process phenol will be separated out as a brownish liquid which contains a small amount of naphthalene, diphenyl, diphenylene oxide and traces of other by-products. The formation of the phenol may be observed by means of a sight glass 20 interposed between the condenser 19 and a receptacle 21 wherein the phenol may be collected.

The phenol is isolated by fractional distillation in a vacuum and can be readily purified by recrystallization. The remaining gaseous mixture, after being enriched in benzene and nitric acid, can again be passed through the heating tube 17 a number of times until the concentration of the oxygen gets too low to function efficiently when the gases should then be discarded. This cycle of operation may be obtained in any approved manner, as for example, the method followed in my aforesaid Reissue Patent No. 15,789, wherein the gases leaving the condenser are subjected to a washing and scrubbing operation in a scrubber from which they are returned into the system from which they originated. Apparatus for this purpose may be inserted in the system by being connected to the outlet pipe 22 from whence the uncondensible or tail gases may be taken off.

The proportions of benzene, air and nitric acid or nitrogen oxides may be widely varied with good results although it is preferred to use three volumes of air mixed with one volume of benzene vapors and a quantity of nitric acid equal to one per cent by weight of the benzene used.

The temperature of the reaction chamber may be varied over a wide range. Phenol is produced when the temperature of the reaction chamber is considerably below a red heat and continues to be formed far above a dull red heat, although it is preferred to use the degree of heat given. Also the rate of flow of the gas may be widely varied with good results. However, it is preferred to use a rate of flow which would cause the gases to remain in the furnace about three seconds.

It is apparent from reference to the literature and consideration of the chemical reactions which take place in the reaction chamber 17 that the nitrogen oxides function merely as a catalyzer of the type that remains unchanged during the reaction promoted by the use of the same and does not act as an oxidizing agent. This contention is believed to be established partly by the fact that the relatively small quantity of nitrogen oxides, as compared with the quantity of benzene, used is insufficient to oxidize the benzene. It is however possible to make phenol from benzene and oxides of nitrogen according to this process, where the oxides of nitrogen do not function as catalyzers but as oxidizing agents, and although it is preferred to use them together with air and in such small amounts that they act as catalyzers it is not wished to be limited to the catalytic action of oxides of nitrogen.

What is claimed is:

1. The step in the process of producing phenol comprising mixing benzene with oxides of nitrogen and heating the mixture to a reaction temperature.

2. The step in the process of producing phenol comprising mixing benzene with oxides of nitrogen in the presence of oxygen and heating the mixture to a reaction temperature.

3. The step in the process of producing phenol comprising mixing benzene with oxides of nitrogen in the presence of oxygen and heating the mixture to a temperature of about 700° C.

4. A process of producing phenol comprising mixing benzene, oxygen and a gaseous catalyzer consisting of nitrogen oxides, the nitrogen oxides being used in relatively small quantities as compared with the quantity of benzene, heating the mixture to a reaction temperature and separating the phenol formed from the mixture.

5. The process of producing phenol comprising mixing benzine, air and a relatively small quantity of a gaseous catalyzer consisting of nitrogen oxides, heating the mixture to a temperature of about 700° C. and separating the phenol formed from the mixture.

6. The process of producing phenol comprising mixing benzene, air and nitrogen oxides, the nitrogen oxides being about 1% by weight of the mixture of benzene and air, heating the mixture to a reaction temperature and separating the phenol formed from the mixture.

7. A process of producing phenol comprising mixing benzene, air and nitrogen oxides, the quantity of nitrogen oxides being less than the quantity of benzene by weight, heating the mixture to a reaction temperature and separating the phenol formed from the mixture.

In testimony whereof, I have hereunto subscribed my name this 15th day of June 1923.

CARLISLE H. BIBB.